April 26, 1966   G. R. LAWSON   3,248,643
FULL-RANGE PHASE-CONTROL A.C. SWITCH
Filed April 25, 1962
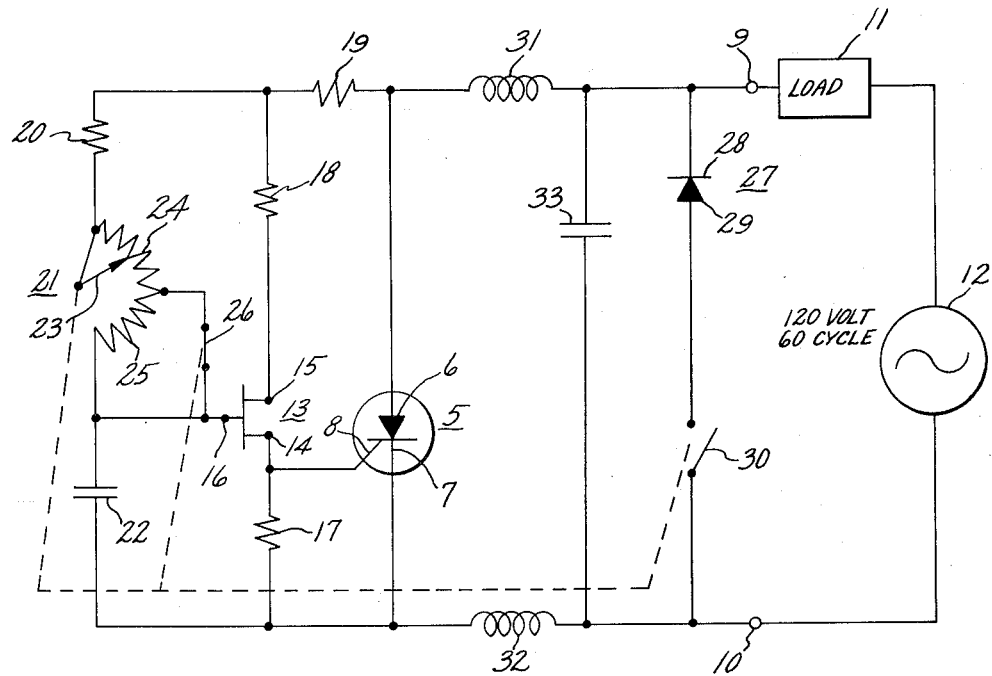
Inventor:
Gustaf R. Lawson
by Allard A. Braddock
His Attorney

United States Patent Office 3,248,643
Patented Apr. 26, 1966

3,248,643
FULL-RANGE PHASE-CONTROL A.C. SWITCH
Gustaf R. Lawson, West Warwick, R.I., assignor to General Electric Company, a corporation of New York
Filed Apr. 25, 1962, Ser. No. 190,020
7 Claims. (Cl. 323—22)

This invention relates to an alternating current switch and, in particular, to a phase-control alternating current switch utilized to control current flow through a load.

It is frequently desirable to effect continuous control over the R.M.S. current flowing from an alternating current source through a load. Alternating current switches of the phase-control type, incorporating controlled rectifiers, are frequently used to control the intensity of light produced by a lighting load. In such switches, the firing angle of the controlled rectifier is varied over a controllable range to accordingly alter the R.M.S. value of the current flowing through the controlled rectifier and the lighting load, thus providing a dimming control. Heretofore, full-range control, i.e. control whereby the load current may be gradually and continuously varied from zero to maximum, has been obtained by utilizing a pair of controlled rectifiers connected back-to-back or by utilizing a single controlled rectifier in conjunction with a plurality of diodes.

It is an object of the invention to provide an improved phase-control alternating current switch requiring fewer components.

It is another object of the invention to provide an improved, full-range, phase-control alternating current switch which provides gradual and continuous control of the current flowing through a load.

It is a further object of the invention to provide an improved and simplified full-range, phase-control alternating current switch which utilizes only a single diode in conjunction with a single controlled rectifier to attain full range light intensity control in a dimmer arrangement.

Briefly stated, in accordance with the invention, full-range control of alternating current through a load is effected by exercising control over the conduction period of the silicon controlled rectifier during the positive half of an applied cycle of A.C. voltage, and switching a diode into the circuit at the point when the load current reached one-half of the maximum. The diode is poled to pass the negative half of the A.C. cycle and simultaneously with the connection of the diode, the control circuit of the controlled rectifier is modified to re-establish control over the positive half cycle. Thus, from zero to one-half maximum load current, the negative half cycle of the source is blocked and the phase angle of the source at which the controlled rectifier commences conduction during the positive half cycle is varied. When the load current is one-half maximum, i.e., when the controlled rectifier allows current to flow through the load during the entire positive half cycle, the diode is switched into the circuit to apply the entire negative one-half cycle of the alternating current source to the load and the control circuit of the controlled rectifier is simultaneously modified to render the controlled rectifier substantially nonconductive during the positive half-cycle period. At this point the load current remains at one-half its maximum value. Variation of the firing angle of the controlled rectifier again allows current to flow to the load during the positive one-half cycle, the sum of the currents during the negative and positive half cycles varying the load current from one-half maximum to maximum in accordance with the firing angle of the controlled rectifier. Thus, full range control of the load current is attained.

The subject matter of the invention is particularly pointed out and distinctly claimed in the concluding portion of the specification. The invention, however, both as to organization and method of operation, may best be understood by reference to the following description taken in connection with the accompanying drawing which shows a circuit diagram of the full-range, phase-control alternating current switch of the invention.

The embodiment shown incorporates a controlled rectifier 5 which may be a silicon controlled rectifier, e.g. General Electric Type C11BX. The controlled rectifier has an anode electrode 6, a cathode electrode 7, and a gate electrode 8. The anode electrode 6 and the cathode electrode 7 are connected to switch terminals 9 and 10 respectively.

The load 11, which may be a lighting load, is connected in series with alternating current source 12, the combination being connected between terminals 9 and 10. Thus, by controlling the firing angle of the controlled rectifier 5, the current through load 11 can be controlled.

A control circuit is provided for controlling the firing angle of the controlled rectifier, i.e. the point in the alternating current cycle of the source at which the controlled rectifier switches from the blocking to the conducting state. The control circuit includes a unijunction transistor 13 having a base-one electrode 14, a base-two electrode 15, and an emitter electrode 16. Resistor 17 connects the base-one electrode 14 to the cathode electrode 7 of controlled rectifier 5 while resistor 18 connects the base-two electrode 15 to the anode electrode 6 of the controlled rectifier through voltage dropping resistor 19.

A firing circuit comprising the serial combination of resistor 20, variable resistor 21, and capacitor 22 is provided to control the conduction of unijunction transistor 13. A terminal of resistor 20 is connected to base-two electrode 15 of unijunction transistor 13 through resistor 18 while a terminal of capacitor 22 is connected to base-one electrode 14 of transistor 13 through resistor 17. The junction point of variable resistor 21 and capacitor 22 is connected to the emitter electrode 16 of unijunction transistor 13. Variable resistor 21, having wiper arm 23, includes two resistance sections 24 and 25. A circuit including switch 26 shunts section 25, switch 26 serving to selectively short section 25.

Rectifier 27, having cathode 28 and anode 29, is connected in series with switch 30 between terminals 9 and 10. Cathode 28 of rectifier 27, which may be a semiconductive diode, is connected to terminal 9 while anode 29 is connected to terminal 10 through switch 30. Rectifier 27 is thus reversely poled with respect to controled rectifier 5.

The phase-control switch may include a high frequency filter comprising inductances 31 and 32 and capacitor 33. Inductance 31 is connected between terminal 9 and anode 6 of controlled rectifier 5 while inductance 32 is connected between terminal 10 and cathode 7 of the controlled rectifier. Capacitor 33 is connected between terminals 9 and 10. The high frequency filter is provided to suppress high frequency transients arising from the operation of the controlled rectifier.

In the operation of the circuit of the invention, variation of the load current from zero to maximum requires that control be exercised over both halves of the alternating current cycle. In the embodiment shown, full-range control of the load current through load 11 is effected by operating the phase-control alternating current switch in one condition while the load current is being varied in the range from zero load current to one-half maximum load current and in a second condition while the load current is being varied in the range from one-half to maximum load current. In the first condition of operation switch 26 is closed and switch 30 opened while in the second condition of operation switch 26 is opened and switch 30 is closed. Switches 26 and 30 are ganged with variable resistor 21 so that switch 26 opens and switch 30 closes when wiper arm 23 terminates contact with section 24 of variable resistor 21 and commences contact with section 25.

Assuming initially that the phase-control switch is operating in the first condition with switch 26 closed and switch 30 open, that controlled rectifier 5 and unijunction transistor 13 are non-conductive, that capacitor 22 is discharged and that the positive half of the alternating current cycle is being applied to terminal 9, the circuit operates in accordance with the following description. The impedance of the firing circuit is chosen to be high with respect to the load impedance so that approximately the source voltage appears across the controlled rectifier, the unijunction transistor and the firing circuit. Controlled rectifier 5 remains non-conductive until a gating pulse is applied to gate electrode 8. The gating pulse is generated in resistor 17 when unijunction transistor 13 is rendered conductive. The conduction of unijunction transistor 13 is controlled by the firing circuit comprisnig resistor 20, variable resistor 21, and capacitor 22. The positive voltage applied to terminal 9 charges capacitor 22 through resistors 19, 20 and section 24 of variable resistor 21. As previously noted, section 25 of variable resistor 21 is shorted out by switch 26 during the first condition of operation of the phase-control switch. When the potential on capacitor 22, which is applied to emitter electrode 16 of unijunction transistor 13, reaches the firing potential of the unijunction transistor, the transistor switches to its conductive state allowing capacior 22 to rapidly discharge through resistor 17. The current flow through resistor 17 generates a positive voltage pulse which is applied to gate electrode 8 of controlled rectifier 5, thereby rendering the controlled rectifier conductive. Upon application of the gating signal to the gate electrode, the voltage drop across the anode-cathode circuit of the controlled rectifier 5 becomes negligible, thereby placing substantially the entire voltage of source 12 across load 11.

Controlled rectifier 5 continues conducting until the negative half of the cycle is applied to terminal 9, the negative potential then extinguishing conduction in the controlled rectifier. The potential developed across capacitor 22 during the negative half cycle renders the emitter electrode 16 of unijunction transistor 13 negative with respect to base-one electrode 14, thereby preventing transistor 13 from becoming conductive. Thus, controlled rectifier 15 is not rendered conductive during the negative half cycle of voltage applied to terminal 9 by source 12.

The rate at which capacitor 22 receives its positive charge during the positive half cycle is a function of the magnitude of the effective resistance of the appropriate section of variable resistor 21 in combination with the resistors 19 and 20. By varying the effective resistance of the appropriate section of variable resistor 21, the time constant of the firing circuit and thereby the time interval required to achieve the necessary firing potential on capacitor 22 is varied. Thus, the rate at which capacitor 22 charges is inversely proportional to the magnitude of the series resistance. In this manner the phase angle at which unijunction transistor 13 and controlled rectifier 5 are fired is varied. This variation of phase angle results in a variation of the time during which controlled rectifier 5 is conductive and hence results in a variation of the R.M.S. current flowing therethrough. Thus, control over the R.M.S. value of current flowing through controlled rectifier 5 and load 11 is obtained. By progressively changing the effective value of section 24 of variable resistor 21 from a maximum to a minimum, the R.M.S. value of current flowing through load 11 during the positive half cycles of the source may thereby be progressively increased from substantially zero to approximately one-half of the maximum.

Operation of the phase-control alternating current of the invention in the second condition, to extend the control exercised over the load current from one-half maximum to maximum, is effected by opening switch 26 and simultaneously closing switch 30. As shown, switches 26 and 30 are ganged with wiper arm 23 of variable resistor 21 and actuated when wiper 23 passes from section 24 to section 25 of variable resistor 21. The closing of switch 30 allows the entire negative half-cycle of the applied alternating current signal from source 12 to pass through diode 27 and hence through the load 11. The opening of switch 26 inserts the large resistance of section 25 in series with capacitance 22. The time constant of the firing circuit is thereby increased and the charging rate of capacitor 22 accordingly decreased to render the operation of the firing circuit in the second condition similar to the operation in the first condition, as previously described.

Thus, by progressively decreasing the effective resistance of section 25 of variable resistor 21, the R.M.S. of current through controlled rectifier 5 and hence load 11 during the positive half cycle is again progressively increased until load current flows during substantially the entire positive half cycle. As noted previously, the connection of diode 27 allows the current to flow through the load during the entire negative half cycle. Thus, operation of the phase-controlled switch in the second condition allows the controllable amounts of current during the positive cycle of the source to be added to the negative half cycle current in the load. Thus the load current can be gradually varied from one-half maximum to maximum of the source.

Therefore, by consecutively operating the switch in the first and second conditions of operation, the current through load 11 may be varied from substantially zero to a maximum load current determined primarily by source voltage and the conduction properties of controlled rectifier 5 and diode 27. If the load is a lamp device, the phase-control alternating current switch may be effectively used as a dimmer.

Although the invention and its operation has been described with reference to a specific embodiment, the invention is not limited to this embodiment. Many modifications within the spirit and scope of the invention will be obvious to those skilled in the art. For example, the control circuit for the controlled rectifier is not limited to a unijunction transistor and the firing circuit for the unijunction transistor is not limited to a resistance-capacitance circuit. It is thus intended that the invention is not limited to the particular details shown and described which may be varied without departing from the spirit and scope of the invention and the appended claims.

What I claim as new and desire to secure by Letters Patent of the United States is:

1. A phase-control alternating current switch comprising:
    (a) a pair of terminals adapted to be connected to the serial combination of a load and an alternating current source, (b) a controllable rectifier device connected between said pair of terminals, (c) first variable means connected to said controllable rectifier device to control the firing angle of said controllable rectifier device during one-half of the cycle of the alternating current source, (d) a rectifier device oppositely poled with respect to said controllable rectifier device, (e) means to connect said rectifier device between said pair of terminals when said controllable rectifier device is conductive during substantially an entire half cycle of the alternating current source, (f) second variable means to control the firing angle of said controllable rectifier device when said rectifier device is connected between said pair of terminals, and (g) means to connect said second variable means to said controllable rectifier device substantially simultaneous with the connection of said rectifier device between said pair of terminals.

2. A phase-control alternating current switch comprising:

(a) a pair of terminals adapted to be connected to the serial combination of a load and an alternating current source, (b) first controllable unidirectional conduction means connected between said pair of terminals and poled to conduct the first half of the applied alternating current cycle, (c) control means connected to said first undiretcional conduction means inluding:

(1) a first variable element,
(2) a second variable element, and
(3) actuating means for selectively varying either said first variable element or said second variable element and adapted to render said first unidirectional conduction means conductive at a selected phase angle of the alternating current source dependent upon the setting of said first or said second variable elements to thereby control the R.M.S. value of current through the first unidirectional conduction means and the load during the first half of the alternating current cycle, (d) second unidirectional conduction means reversely poled with respect to said first unidirectional conduction means, (e) means for connecting said unidirectional conduction means in parallel with said first unidirectional conduction means when the value of R.M.S. current through the load is approximately one-half maximum so as to allow the second half of the alternating current cycle to flow through the load, and (f) means for connecting said second variable element to said control means when the value of R.M.S. current through the load is approximately one-half maximum so as to re-establish control over the conduction of the first unidirectional conduction means and hence the R.M.S. value of current through the load during the first half of the alternating current cycle while applying the full second half of the alternating current cycle to the load through said second unidirectional conduction means.

3. The phase-control alternating current switch of claim 2 in which said first controllable unidirectional conduction means is a semiconductive controlled rectifier.

4. The phase-control alternating current switch of claim 2 in which said second unidirectional conduction means is a semiconductive diode.

5. The phase-control alternating current switch of claim 2 in which said control means comprises:

(a) a parallel circuit having a unijunction transsitor in one branch thereof and having in the other branch the serial combination of a capacitor and a variable resistor which includes a first section traversed by a wiper arm as the first variable element and a second traversed by the wiper arm as the second variable element, (b) means connecting the junction point of the capacitor and variable resistor to said unijunction transistor to control the firing of the unijunction transistor in accordance with the charge on said capacitor, (c) a resistor connected to the output terminal of said unijunction transistor and adapted to provide a voltage pulse when the unijunction transistor is rendered conductive and said capacitor discharges therethrough, and (d) means connecting said resistor to the gate electrode of said first unidirectional conduction means to provide a gating signal to said first unidirection conduction means.

6. The phase-control alternating current switch of claim 2 in which a high frequency filter means is connected between said first unidirectional conduction means and said terminals to attenuate frequencies substantially higher than the frequency of the alternating current source.

7. A phase-control alternating current switch comprising:

(a) a pair of terminals adapted to be connected to the serial combination of a load and an alternating current source, (b) first controllable unidirectional conduction means connected between said pair of terminals for controlling the R.M.S. current flowing through the load during the first half of the alternating current cycle, (c) a unijunction transistor connected between said pair of terminals for controlling the conduction of said first controllable unidirectional conduction means, (d) a load resistor connected in the output circuit of said unijunction transistor, (e) means connecting the common connection of said unijunction transistor and said load resistor to said first controllable unidirectional conduction means, (f) a firing circuit for controlling the conduction of said unijunction transistor and hence the phase angle of the source at which said first unidirectional conduction means commences conduction including:

(1) a variable resistor having a first section and a second section,
(2) actuating means for varying the effective resistance of the first and second sections of said variable resistor,
(3) a first switch means,
(4) means connecting said first switch means in parallel with the second section of said variable resistor,
(5) a capacitor connected to said variable resistor so that the effective resistance of either the first section or the second section of said variable resistor controls the rate at which said capacitor receives its charge from the alternating current source,
(6) means for connecting the serial combination of said variable resistor and said capacitor between said pair of terminals, and
(7) means connecting the common connection of said variable resistor and said capacitor to said unijunction transistor in accordance with the charge on said capacitor, (g) second unidirectional conduction means reversely poled with respect to said first unidirectional conduction means, (h) second switch means connected in series with said second unidirectional conduction means, (i) means for connecting the serial combination of second unidirectional conduction means and said second switch between said pair of terminals, and (j) means connecting said first switch and said second switch to said actuating means so that said first switch opens and said second switch closes when said actuating means ceases varying the effective resistance of the first section on said variable resistor and commences varying the effective resistance of the second section of said variable resistor so that control over the conduction of said first unidirectional conduction means during the first half cycle of the alternating current source is re-established as said second unidirectional conduction means commences passing current to the load during the second half cycle of the alternating current source.

References Cited by the Examiner

UNITED STATES PATENTS

| | | | |
|---|---|---|---|
| 2,920,240 | 1/1960 | Macklem | 315—201 |
| 2,998,547 | 8/1960 | Berman | 315—200 |
| 3,061,744 | 10/1962 | Spira | 307—146 |
| 3,192,466 | 6/1965 | Sylvan et al. | 323—22 |

MILTON O. HIRSHFIELD, *Primary Examiner.*

LLOYD McCOLLUM, *Examiner.*